United States Patent [19]

Maurer

[11] 4,281,567
[45] Aug. 4, 1981

[54] SYSTEM FOR OPTIMIZING THE FUEL CONSUMPTION OF AN INTERNAL COMBUSTION ENGINE

[75] Inventor: Franz Maurer, Schwieberdingen, Fed. Rep. of Germany

[73] Assignee: Robert Bosch GmbH, Stuttgart, Fed. Rep. of Germany

[21] Appl. No.: 80,662

[22] Filed: Oct. 1, 1979

[30] Foreign Application Priority Data

Oct. 4, 1978 [DE] Fed. Rep. of Germany ....... 2843256

[51] Int. Cl.³ .......................................... B60K 41/04
[52] U.S. Cl. ........................................ 74/866; 74/858; 74/859; 74/860
[58] Field of Search ................. 123/350, 361; 60/431, 60/449; 74/843, 856, 857, 858, 859, 860, 865, 866

[56] References Cited

U.S. PATENT DOCUMENTS

| | | | |
|---|---|---|---|
| 3,324,740 | 6/1967 | Lewis et al. ............................ | 74/866 |
| 3,726,159 | 4/1973 | Mizote .................................. | 74/866 |
| 3,890,360 | 6/1975 | Pruvot et al. ......................... | 74/860 |
| 3,927,528 | 12/1975 | van der Kolk ....................... | 74/859 |
| 4,021,712 | 5/1977 | Ishihara et al. ....................... | 74/859 |
| 4,082,013 | 4/1978 | Dornfeld et al. ...................... | 74/859 |
| 4,169,437 | 10/1979 | Fleischer ............................... | 123/102 |
| 4,200,007 | 4/1980 | Espenschied et al. ................. | 74/859 |

FOREIGN PATENT DOCUMENTS 2811574 9/1979 Fed. Rep. of Germany ............ 74/866

*Primary Examiner*—Leslie Braun
*Attorney, Agent, or Firm*—Frishauf, Holtz, Goodman & Woodward

[57] ABSTRACT

Optimum fuel consumption in an internal combustion engine driving a hydrostatic transmission having a continuously variable gear ratio is achieved by first applying the signal derived from the gas pedal directly to the transmission ratio regulator and, secondly, by controlling the fuel consumption of the engine in response to the gas pedal signal as follows: first, the signal from the gas pedal is multiplied by a signal signifying the output speed of the transmission. The so-formed desired power signal is applied to a storage which furnishes a desired engine speed signal in response thereto. The desired speed signal is compared to the actual engine speed and the resulting error signal, after amplification and integration, is applied to a unit controlling the fuel supply of the engine.

6 Claims, 2 Drawing Figures

SYSTEM FOR OPTIMIZING THE FUEL CONSUMPTION OF AN INTERNAL COMBUSTION ENGINE

Cross-reference to related applications and publications:
Published German Disclosure document De-OS No. 28 11 574.7
U.S. Pat. No. 3,927,528
U.S. Pat. No. 3,890,360

The present invention relates to systems which optimize, i.e. minimize, the fuel consumption of internal combustion engines. In particular, it relates to systems for minimizing the fuel consumption of internal combustion engines driving transmissions, such as hydrostatic transmissions, having a continuously variable transmission ratio.

BACKGROUND AND PRIOR ART

A system is disclosed in German Disclosure document OS No. 28 11 574.7 in which an externally controlled input signal signifies the desired power output of an internal combustion engine. A value e.g. the amplitude of this signal is used to address a memory or storage device storing a characteristic curve of the internal combustion engine. Specifically, for each value of desired power, the required fuel supply value specified by the characteristic curve is generated. The required fuel supply value, in the form of a corresponding signal, is then used to control the throttle valve of a carburetor or the control rod in an injection pump of a diesel motor. This required fuel supply value, i.e. the characteristic curve, is designed for the value which will optimize fuel consumption of the engine at the given desired power. Further, the desired power signal is also applied to a storage storing the transmission characteristic. A signal corresponding to the output speed of the engine is also applied to the transmission characteristic storage. The latter furnishes a signal controlling the transmission ratio in response to the two signals applied thereto. This system can be used both with transmissions in which the gear ratio is controlled in steps and transmissions wherein a continuous adjustment of the gear ratio is possible. In this known system, a switch is provided which switches it from a minimum consumption regulation to a regulation optimizing the power output when the required fuel signal and the speed of the engine signify an actual power output substantially less than the desired power output, i.e. when a large increase in power output is required. This apparatus requires two storages for characteristic curves in addition to the above-mentioned switch which must be present to allow rapid increases in power output when required.

In the system described in U.S. Pat. No. 3,324,740, the driver regulates the transmission ratio and the engine speed under normal operating conditions, the engine speed being controlled in conventional fashion by control of the fuel supply via the carburetor or the injection pump. A first regulator controls the desired engine speed by adjusting the throttle valve, while a second regulator controls the transmission ratio. A third regulator is provided to prevent stalling of the engine by changing the transmission ratio if the output shaft is overloaded. This regulator also prevents the speed of the engine from exceeding a predetermined maximum speed. However, this third regulator only becomes effectve when the desired engine speed cannot be maintained by the first regulator. A system for controlling the fuel consumption in an engine driving a hydrostatic transmission having a continuously variable transmission ratio is disclosed in U.S. Pat. No. 3,927,528. In this system, the driving motor, an internal combustion engine and the hydrostatic transmission are controlled in response to the desired torque signified by the position of the gas pedal and the actual torque derived from the hydrostatic transmission pressure and volume. An engine speed sensor senses the output speed of the engine and furnishes an engine speed signal corresponding thereto. The engine speed signal is used to shift the null point of a regulating stage which is responsive to a signal signifying the then-present engine torque and controls the position of a tapered disk fixing the transmission ratio of the hydrostatic transmission.

It is a disadvantage of both of the above-described systems that the operating parameters of the engine which are required to effect minimum fuel consumption and therefore the cleanest possible exhaust are either not utilized or are only approximated. The goal of minimum fuel consumption and clean exhaust is therefore not achieved.

In U.S. Pat. No. 3,890,360, a system is described in which the control for fuel supply and for the transmission ratio is achieved by first comparing the signal resulting from operation of the foot pedal (which signifies a desired engine speed signal) to a signal signifying the actual engine speed and utilizing the difference to control solenoid valves which control the continuously variable transmission ratio. The difference signal is also used to control a solenoid valve which regulates the throttle valve of position. In this system, too, optimum fuel consumption is not really achieved, since all operating parameters relevant thereto are not fully considered. In addition, none of the above-described systems allow the full power output of the engine to be available when needed under emergency conditions. For example, if the driver is trying to pass another vehicle on the road, full power should be available immediately.

THE INVENTION

Briefly, in the present invention the input signal directly specifies a desired force (torque) and directly controls the adjuster which adjusts the transmission ratio of the hydrostatic transmission. At the same time, the desired force signal is combined with a signal signifying the output speed of the transmission to form a desired power signal. The latter is applied to a storage which stores a characteristic curve of the engine. Specifically, the storage furnishes a desired engine speed signal, namely a speed signal which signifies the speed at which optimum fuel consumption will occur for the desired power output in response to the desired power signal. The desired speed signal is compared to a signal signifying the actual engine speed and an error signal is created corresponding to the difference therebetween. The error signal controls the speed of the engine by, for example, adjusting the throttle valve of a carburetor or the control rod in an injection pump. With this system, the fuel consumption is optimized with relatively little equipment and, in addition, a rapid increase in power output is possible since the desired force signal acts directly on the regulator regulating the transmission ratio.

In a particularly preferred embodiment, stalling of the motor in the higher load region is prevented by the provision of an auxiliary regulator which limits the effect the desired force signal (input signal) can have on the gear ratio when the desired force signal specifies a higher engine torque than the engine can deliver. The signal which controls the auxiliary regulator is derived from the difference between a signal signifying the difference between the actual engine torque and the maximum permissible engine torque on the one hand and the abovementioned error signal on the other hand. A proportional controller (linear amplifier) having a variable gain forms a part of the auxiliary regulator. The gain is controlled as a function of the ratio between the actual engine speed and the actual speed at the output of the transmission. The gain therefore varies in correspondence to the transmission ratio.

BRIEF DESCRIPTION OF THE DRAWING

FIG. 1 is a plot of power of the internal combustion engine (ordinate) vs. engine speed (abscissa). Fuel consumption values are noted along the curve. In the middle region of characteristic curve 1 the value is lowest at 234 g/kwh, while in the upper regions it is 245 g/kwh and in the lower regions it rises to 270 g/kwh. Curve 1 is derived from the conventional performance graph for fuel consumption, in which torque is plotted as a function of speed and hyperbolas of power output are also entered. Constant fuel consumption lines having a shape resembling relief lines of a region intersect the hyperbolas. Each point on characteristic curve 1 is located approximately in the middle between the two points of intersection of the constant fuel consumption lines with the power hyperbolas, as shown in FIG. 6 of De-OS 28 11 574.7

Referring now to FIG. 2, an input signal signifying the desired force or torque is furnished by, for example, gas pedal 2. The input signal furnished thereby is applied to a delay 3 which is provided to prevent sudden changes in engine speed which may cause undesired jolts for the vehicle and the passenger. The output of delay 3 is connected through a line or other coupling 4 directly to a transmission ratio regulator 5. Transmission ratio regulator 5 adjusts the volume and/or pressure of a pump and motor of a hydrostatic transmission 6 whose output drives a shaft 7. Shaft 7 drives the wheels, 9, of the vehicle through a differential 8. A suitable transmission ratio regulator and hydrostatic transmission is shown in FIGS. 1 and 2 (8 and 9) of U.S. Pat. No. 3,890,360.

Figure 1:
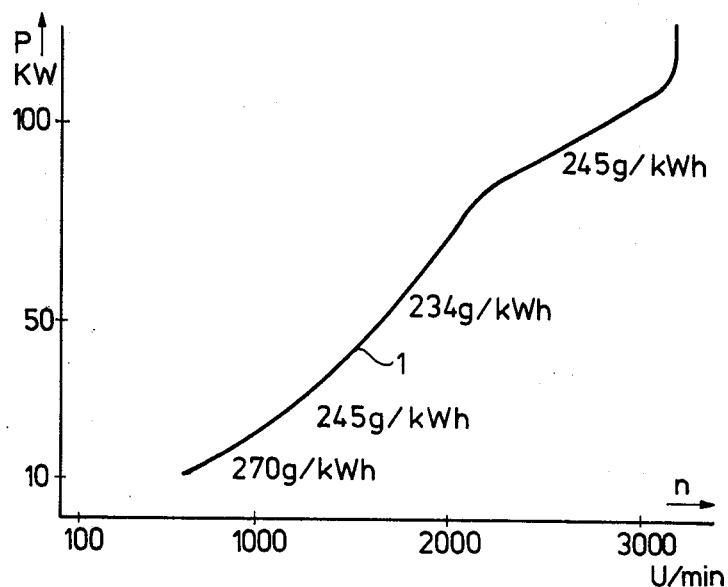
FIG. 1 shows a characteristic curve of power vs. speed, with different values of fuel consumption entered along the curve.
Figure 2:
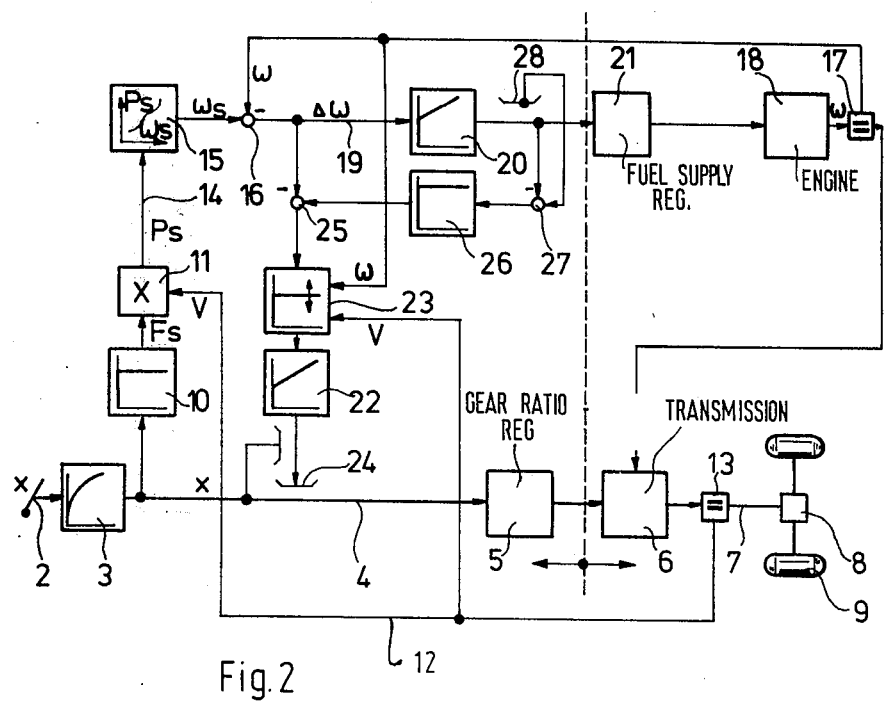
FIG. 2 is a block diagram illustrating a preferred embodiment of the invention.

The output of delay 3 is further applied to a proportional controller (linear amplifier) 10. The output of proportional controller 10 is applied to one input of a multiplier 11 whose other input receives, via a line 12 the output of a sensor 13 which senses the speed of shaft 7 or a speed proportional thereto. The inputs to multiplier 11 thus receive a signal signifying a desired force, $F_s$, and an output speed signal v. Its output therefore is a desired power $P_s$. This desired power signal is applied through a connector 14 to a storage 15. In response to the so-applied desired power signal, storage 15 furnishes a desired engine speed signal, $w_s$, which signifies the speed of the internal combustion engine at which, at the desired power, an optimum (minimum) fuel consumption will occur. The curve linking the desired power to the desired engine speed is curve 1 of FIG. 1. Storage 15 may, for example, be a digital storage in which particular storage locations storing particular desired engine speed values are addressed by the corresponding power signal values. For this case, an analog-digital converter may have to be provided preceding storage 15. In an analog embodiment, a variable gain amplifier may be used.

The desired engine speed signal is applied to one input of a comparator 16 whose other input receives a signal signifying the actual engine speed and derived from a speed sensor 17. A first error signal $\Delta w$ corresponding to the difference between the signals applied at the two inputs is created at the output of comparator 16. This error signal is applied to a regulator, preferably a proportional-integral, or PI regulator, 20, whose output is herein referred to as the fuel control signal. The fuel control signal is applied to a conventional fuel supply regulator or metering arrangement such as, for example, the throttle valve of a carburetor or the control rod in an injection system. Unit 21 therefore causes the correctly metered amount of fuel to be supplied to internal combustion engine 18.

When the position of the gas pedal changes, that is when the input signal changes, the transmission ratio of the hydrostatic transmission 6 is changed in such a way that a force corresponding to the desired force signified by the input signal is applied to the wheels, namely a force which will overcome the road resistance and, if required, allow required accelerating torque to become effective. The speed of engine 18 is regulated and as much fuel is supplied thereto as is required for causing it to operate at the speed at which the fuel consumption is optimized.

If it is now assumed that gas pedal 2 is in such a position that the power required from engine 18 would exceed its maximum power output, then an auxiliary regulator 22 becomes effective. The auxiliary regulator 22 which, preferably, is a proportional-integral, or PI regulator, receives its input signal from a proportional controller 23 whose proportionality factor (gain) is variable. Controller 23 may, for example, be a variable gain amplifier. The output of auxiliary regulator 22 is applied to a limiter 24 which limits the signal applied to transmission ratio regulator 5, i.e. limits the effect the input signal can have on this unit. In a mechanical embodiment, limiter 24 consists of a movable stop, i.e. for example the movement of a member at the output of delay 3 is stopped when it reaches a position specified by limiter 24. In an electrical embodiment, limiter 24 could be a difference amplifier which saturates at a predetermined difference signal, the difference signal being derived from the difference between the input signal and a reference signal. The reference signal would be variable in accordance with the output of proportional controller (linear amplifier) 23.

The input signal for proportional controller 23 is derived from the output of a second comparator 25. One input signal to second comparator 25 is the abovementioned error signal. The other input is connected through a proportional controller (linear amplifier) 26 from the output of a third comparator 27. One input of comparator 27 receives a signal proportional to the torque of engine 18, that is it is, for example, connected to the output of unit 20. The other input to comparator 27 is derived from a limiter 28 which furnishes a maximum torque signal and which may, for example, be a voltage divider. The signal at the output of proportional controller 26 thus is a signal corresponding to the difference between the actual torque and the full load torque of engine 18. The gain of auxiliary regulator 22 or the proportionality factor (gain) of proportional controller 23 is varied as a function of w/v. These signals are derived from speed sensors 17 and 13, respectively.

When the fuel control signal, that is the signal at the output of unit 20 is equal to the maximum (full load) torque signal, then auxiliary regulator 22 limits the actual signal applied to transmission ratio adjuster or regulator 5 to the extent that engine 18 will not be either overloaded or stall.

The above-described system allows an optimum operating point to be automatically set for each operating condition of the vehicle. Very little equipment is required. In addition, fuel consumption, pollution, and noise emission are reduced. The position of the gas pedal determines the tractive force or torque applied to wheels 9. Specifically, the speed for optimum fuel consumption is determined from the desired force derived from the position of the gas pedal and from the then-present speed of the engine. The engine is regulated to this speed by a fuel control signal furnished by controller 20, which acts as a speed regulator. If the output of speed regulator 20 is in its limit position, then the auxiliary regulator 22 takes over the function of speed regulator by limiting the effect of the input signal on the transmission ratio adjuster 5.

Various changes and modifications may be made within the scope of the inventive concepts.

I claim:

1. In a motor vehicle having an internal combustion engine (18), first sensor means (17) connected to said internal combustion engine for furnishing an engine speed signal indicative of the speed thereof, hydrostatic transmission means connected to said internal combustion engine and having a continuously adjustable transmission ratio, second sensor means (13) coupled to said hydrostatic transmission means for furnishing an output speed signal indicative of the output speed thereof, means (21) connected to said internal combustion engine for adjusting the fuel supply of said internal combustion engine in accordance with a fuel control signal applied thereto, and means (2) for furnishing an input signal under external control, a system for minimizing fuel consumption of said internal combustion engine comprising means (4, 5) connected to said input signal furnishing means and said hydrostatic transmission means for adjusting said transmission ratio in response to said externally controlled input signal;

means (11) connected to said input signal furnishing means and said second sensor means for multiplying said input signal by said output speed signal and furnishing a desired power signal corresponding to the so-multiplied values;

storage means (15) connected to said multiplier means for furnishing a desired speed signal signifying the optimum engine speed for minimum fuel consumption in response to said desired power signal;

means (16) connected to said storage means and said first sensor means for comparing said desired engine speed signal to said actual engine speed signal and furnishing a first error signal corresponding to the difference therebetween; and means (20) interconnected between said comparing means and said fuel supply adjusting means for furnishing said fuel control signal to said fuel supply adjusting means in response to said first error signal.

2. Apparatus as set forth in claim 1, wherein said comparing means constitutes first comparator means;

further comprising means (26, 27) for furnishing a difference signal corresponding to the difference between the then-present engine torque and the full load engine torque, second comparator means 25 for comparing said difference signal to said first error signal and furnishing a limiter control signal corresponding to the difference therebetween, and auxiliary regulator means (22, 24) connected to said second comparator means and said transmission ratio adjusting means for limiting the response of said transmission ratio adjusting means to said input signal in accordance with said limiter control signal.

3. Apparatus as set forth in claim 2, wherein said difference signal furnishing means comprises means (28) for furnishing a maximum torque signal corresponding to the full load torque of said engine, third comparator means (27) for comparing said maximum torque signal to said fuel control signal and furnishing a third comparator output signal corresponding to the difference therebetween, and means (26) connected to said third comparator means for furnishing a signal having an amplitude proportional to the amplitude of said third comparator output signal, the so-furnished signal constituting said difference signal.

4. Apparatus as set forth in claim 2, wherein said auxiliary regulator means comprises proportional controller means (23) connected to said second comparator means (25) for furnishing a controller output signal proportional to said limiter control signal.

5. Apparatus as set forth in claim 4, wherein said proportional controller means (23) has a variable gain.

6. Apparatus as set forth in claim 5, wherein said proportional controller means (23) has a gain varying in accordance with the ratio of said actual engine speed to said output speed.

* * * * *